(12) United States Patent
Lu

(10) Patent No.: US 7,854,993 B2
(45) Date of Patent: *Dec. 21, 2010

(54) SOUND REDUCING POLYMER INTERLAYERS

(75) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/371,558

(22) Filed: Feb. 13, 2009

(65) Prior Publication Data

US 2009/0226750 A1    Sep. 10, 2009

Related U.S. Application Data

(63) Continuation of application No. 11/081,951, filed on Mar. 17, 2005, now Pat. No. 7,510,771.

(51) Int. Cl.
*B32B 17/10* (2006.01)
*B32B 27/08* (2006.01)

(52) U.S. Cl. .................. 428/437; 428/436; 428/524; 428/525

(58) Field of Classification Search .......... 428/436, 428/437, 524, 525
See application file for complete search history.

(56) References Cited

U.S. PATENT DOCUMENTS

| | | | | |
|---|---|---|---|---|
| 3,920,878 A | * | 11/1975 | Fariss et al. ............... | 428/437 |
| 5,190,826 A | | 3/1993 | Asahina | |
| 5,340,654 A | | 8/1994 | Ueda | |
| 5,728,472 A | * | 3/1998 | D'Errico ............... | 428/437 |
| 2001/0046595 A1 | * | 11/2001 | Moran et al. ............ | 428/212 |
| 2003/0118840 A1 | * | 6/2003 | Moran et al. ............ | 428/425.6 |
| 2003/0139520 A1 | * | 7/2003 | Toyama et al. ........... | 524/503 |

FOREIGN PATENT DOCUMENTS

| | | |
|---|---|---|
| EP | 0710545 | 5/1996 |
| EP | 1281690 | 5/2003 |
| JP | 2229742 | 9/1990 |
| JP | 3204890 | 9/1991 |
| JP | 5138840 | 6/1993 |
| JP | 5310449 | 11/1993 |
| JP | 06-115980 | 4/1994 |
| JP | 10036146 | 2/1998 |
| JP | 11255827 | 9/1999 |
| JP | 191348 | 7/2000 |
| JP | 200272936 | 10/2000 |
| JP | 200272937 | 10/2000 |
| JP | 2000319044 | 11/2000 |
| JP | 2000326445 | 11/2000 |
| JP | 200148601 | 2/2001 |
| JP | 2001106554 | 4/2001 |
| JP | 2001106556 | 4/2001 |
| JP | 2001192243 | 7/2001 |
| JP | 2001206742 | 7/2001 |
| JP | 2001206743 | 7/2001 |
| JP | 2001220183 | 8/2001 |
| JP | 2001220184 | 8/2001 |
| JP | 2001226152 | 8/2001 |

OTHER PUBLICATIONS

Patent Abstracts of Japan from the European Patent Office, Publication No. 07206483, Appl. No. 06000428, filed Aug. 8, 1995, Sekisui.
Patent Abstracts of Japan from the European Patent Office, Publication No. 4317443, filed Nov. 9, 1992, Sekisui.
Patent Abstracts of Japan from the European Patent Office, Publication No. 7172879, filed Jul. 11, 1995, Sekisui.
Patent Abstracts of Japan from the European Patent Office, Publication No. 7097240, filed Apr. 11, 1995, Sekisui.

* cited by examiner

*Primary Examiner*—D. S Nakarani
(74) *Attorney, Agent, or Firm*—Lewis, Riche & Fingersh, L.C.

(57) ABSTRACT

The present invention is in the field of polymer interlayers and multiple layer glass panels comprising polymer interlayers, and, more specifically, the present invention is in the field of polymer interlayers comprising multiple thermoplastic sheets.

38 Claims, No Drawings

SOUND REDUCING POLYMER INTERLAYERS

CROSS-REFERENCE TO RELATED APPLICATIONS

This application claims priority to and is a continuation of U.S. application Ser. No. 11/081,951 filed on Mar. 17, 2005, now U.S. Pat. No. 7,510,771 B2, which is hereby incorporated by reference in its entirety.

FIELD OF THE INVENTION

The present invention is in the field of polymer interlayers and multiple layer glass panels comprising polymer interlayers, and, more specifically, the present invention is in the field of polymer interlayers comprising multiple thermoplastic sheets.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

The thermoplastic polymer found in safety glass can consist of a single layer of a thermoplastic polymer, such as poly(vinyl butyral), that has had one or more physical characteristics modified in order to reduce the percentage transmission of sound through the glass. Conventional attempts at such acoustic dampening have included using thermoplastic polymers with low glass transition temperatures. Other attempts have included using two adjacent layers of thermoplastic polymer wherein the layers have dissimilar characteristics (see, for example U.S. Pat. Nos. 5,340,654 and 5,190,826, and U.S. Patent Application 2003/0139520 A1).

Further improved compositions and methods are needed to enhance the sound dampening characteristics of multiple layer glass panels, and specifically multiple layer glass panels comprising poly(vinyl butyral) layers, while allowing facile processing and without negatively impacting optical qualities.

SUMMARY OF THE INVENTION

The present invention provides multiple layer interlayers that can be used in multiple layer glass panel type applications to reduce the amount of sound transmitted through the panel. This effect is achieved by maintaining a difference in the plasticizer concentration in two or more polymer sheets that have been combined into a single multiple layer interlayer.

DETAILED DESCRIPTION

According to the present invention, it has now been surprisingly discovered that superior sound suppression characteristics can be imparted on multiple layer glass panels by incorporating a multiple layer interlayer into the panels, where the interlayer comprises two polymer sheets having different plasticizer concentrations. By formulating polymer sheets to stably contain differing plasticizer concentrations, as described in detail herein throughout, it has been found that sound transmission through multiple layer glass panels can be reduced by, for example, more than 2 decibels in the frequency or frequency region of interest. Further, because embodiments having three polymer sheet layers can be formulated to be easily handled and used as a direct replacement for conventional interlayers in conventional processes, interlayers of the present invention will be usable in many applications without requiring any modification to the manufacturing method used in the applications. For example, automotive windshield applications can involve the use of a conventional polymeric interlayer that can be replaced with an interlayer of the present invention without altering the lamination process used to form the finished windshield.

As used herein, an "interlayer" is any thermoplastic construct that can be used in multiple layer glass applications, such as safety glass in windshields and architectural windows, and a "multiple layer" interlayer is any interlayer that is formed by combining, usually through laminating processes, two or more individual layers into a single interlayer.

In various embodiments of the present invention, a multiple layer interlayer comprises two polymer sheets disposed in contact with each other, wherein each polymer sheet comprises a thermoplastic polymer, as detailed elsewhere herein. The thermoplastic polymer can be the same or different in each sheet. In these embodiments, a sound dampening effect is imparted to the interlayer by fabricating each polymer sheet with a different plasticizer content, and then laminating the two layers together to form a single, multiple layer interlayer. The composition of the polymer sheets is such that net migration of plasticizer from one polymer sheet to another is negligible or zero, thereby maintaining the plasticizer differential.

As used herein, "plasticizer content" can be measured as parts per hundred resin (phr) parts, on a weight per weight basis. For example, if 30 grams of plasticizer is added to 100 grams of polymer resin, then the plasticizer content of the resulting plasticized polymer would be 30 phr. As used herein throughout, when the plasticizer content of a polymer sheet is given, the plasticizer content of that particular sheet is determined with reference to the phr of the plasticizer in the melt that was used to produce that particular sheet.

For sheets of unknown plasticizer content, the plasticizer content can be determined via a wet chemical method in which an appropriate solvent, or a mixture of solvents, is used to extract the plasticizer out of the sheet. By knowing the weight of the sample sheet and the weight of the extracted sheet, the plasticizer content in phr can be calculated. In the case of a two polymer sheet interlayer, one polymer sheet can be physically separated from another before the plasticizer content in each of the polymer sheets is measured.

In various embodiments of the present invention, the plasticizer content of the two polymer sheets differ by at least 8 phr, 10 phr, 12 phr, 15 phr, 18 phr, 20 phr, or 25 phr. Each sheet can have, for example 30 to 100 phr, 40 to 90 phr, or 50 to 80 phr.

In various embodiments of the present invention, the residual hydroxyl contents of the thermoplastic polymer components of the polymer sheets are different, which allows for the fabrication of sheets with stable plasticizer differences. As used herein, residual hydroxyl content (as vinyl hydroxyl content or poly(vinyl alcohol) (PVOH) content)

refers to the amount of hydroxyl groups remaining as side groups on the polymer chains after processing is complete. For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments of the present invention, the residual hydroxyl content of the two adjacent polymer sheets can differ by at least 1.8%, 2.0%, 2.2%, 2.5%, 3.0%, 4.0%, 5.0%, 7.5%, or by at least 10%. This difference is calculated by subtracting the residual hydroxyl content of the sheet with the lower residual hydroxyl content from the residual hydroxyl content of the sheet with the greater residual hydroxyl content. For example, if a first polymer sheet has a residual hydroxyl content of 20 weight percent, and a second polymer sheet has a residual hydroxyl content of 17 weight percent, then the residual hydroxyl content of the two sheets differs by 3 weight percent.

For a given type of plasticizer, the compatibility of that plasticizer in a poly(vinyl butyral) is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer and formulate each of the polymer sheets to allow for the proper plasticizer loading and to stably maintain the difference in plasticizer content between the polymer sheets.

As is known in the art, residual hydroxyl content can be controlled by controlling reaction times, reactant concentrations, and other variables in the manufacturing process. In various embodiments, the residual hydroxyl content of the two sheets is as follows: first sheet less than 25% and second sheet less than 23%; first sheet less than 23% and second sheet less than 21%; first sheet less than 21% and second sheet less than 19%; first sheet less than 20% and second sheet less than 17%; first sheet less than 18% and second sheet less than 15%; first sheet less than 15% and second sheet less than 12%. In any of these embodiments, any of the values given in the previous paragraph for the difference in hydroxyl content between the two layers can be used.

As used herein, tensile break stress, or tensile strength, of a polymer sheet is defined and measured according to the method described in JIS K6771. In various embodiments of the present invention, the two polymer sheets have a tensile break stress according to the following, wherein the first polymer sheet in the following list is the polymer sheet with the lower plasticizer content: first polymer sheet greater than 135 kilograms per square centimeter and second polymer sheet less than 120 kilograms per square centimeter; first polymer sheet greater than 150 kilograms per square centimeter and second polymer sheet less than 135 kilograms per square centimeter; first polymer sheet greater than 165 kilograms per square centimeter and second polymer sheet less than 150 kilograms per square centimeter; or first polymer sheet greater than 180 kilograms per square centimeter and second polymer sheet less than 165 kilograms per square centimeter; or in general the two polymer sheets differ in tensile break stress by at least 15 kilograms per square centimeter.

As used herein, a conventional laminated glass is formed through laminating a conventional interlayer, which is typically used today for commercial laminated glass, wherein the conventional interlayer has a tensile break stress of 200 kilograms per square centimeter or higher. For the purpose of the present invention, conventional laminated glass is referred to as a "reference laminate panel" or "reference panel."

Improvement in acoustic insulation as used to characterize glass laminates consisting of the interlayers of the present invention is determined with reference to a reference laminate panel as described in previous paragraph. In typical laminates with two outer layers of glass, the "combined glass thickness" is the sum of the thickness of the two layers of glass; in more complex laminates with three or more layers of glass, the combined glass thickness would be the sum of the three or more layers of glass.

For purposes of the present invention a "coincident frequency" means the frequency at which a panel exhibit a dip in sound transmission loss due to "coincident effect". The coincident frequency of the reference panel is typically in the range of 2,000 to 6,000 Hertz, and can be empirically determined from a monolithic sheet of glass having a thickness equal to the combined glass thickness of glass in the reference panel from the algorithm $$f_c = \frac{15,000}{d}$$

where "d" is the total glass thickness in millimeters and "$f_c$" is in Hertz.

For purposes of this invention, improvement in acoustic performance can be measured by an increase in sound transmission loss at the coincident frequency (reference frequency) of the reference panel.

"Sound transmission loss" is determined for a laminate of the present invention or conventional reference panel of fixed dimensions with ASTM E90 (95) at a fixed temperature of 20° C.

In various embodiments of the present invention, multiple layer interlayers of the present invention, when laminated between two panes of glass sheet, reduce the transmission of sound through the laminated glass panel by at least 2 decibels (dB) relative to a comparable reference panel having a single conventional interlayer with an comparable thickness of the multiple layer interlayer of the present invention.

In various embodiments of the present invention, interlayers of the present invention, when laminated between two sheets of glass, improve the sound transmission loss by at least 2 dB, more preferably 4 dB, and even more preferably 6 dB or higher, say 8 dB or higher at the reference frequency relative to a comparable reference panel.

Prior art attempts to produce interlayers comprising adjacent polymer sheets that reduce sound transmission through a multiple layer glass panel have relied on various compositional permutations between those sheets. Examples include U.S. Pat. No. 5,190,826, which teaches the use of acetals of differing carbon length, and Japanese Patent Application 3124441A and U.S. Patent Application 2003/0139520 A1, which teach the use of differing polymerization degree. Two other applications, Japanese Patent 3,377,848 and U.S. Pat.

No. 5,340,654, teach the use of residual acetate levels of at least 5 mole % in one of two adjacent sheets as a compositional difference.

In various embodiments of the present invention, and distinctly different from the approach used in those applications, two adjacent polymer sheets of the present invention have the differing plasticizer content as described above, and each further has a residual acetate content of less than 5 mole %, less than 4 mole %, less than 3 mole %, less than 2 mole %, or less than 1 mole %. These residual acetate concentrations can be combined with the residual hydroxyl contents given above, in any combination, to form two polymer sheets of the present invention having the described differences in plasticizer content and residual hydroxyl content while having little to no residual acetate content. Further embodiments of multiple layer interlayers of the present invention include interlayers having more than two polymer sheets, wherein one or more of the additional polymer sheets has a residual acetate content of less than 5 mole %, less than 4 mole %, less than 3 mole %, less than 2 mole %, or less than 1 mole %.

Further embodiments of the present invention include any of the foregoing embodiments further comprising a third polymer sheet that is disposed in contact with the polymer sheet having the higher plasticizer content. Addition of this third polymer sheet layer results in a three layer construct that has the following structure: First polymer sheet with relatively low plasticizer content//Second polymer sheet with relatively high plasticizer content//Third polymer sheet. This third polymer sheet can have the same composition as the first polymer sheet, or it can be different.

In various embodiments, the third polymer sheet has the same composition as the first polymer sheet, which provides a three layer laminated interlayer that has a relatively difficult to handle polymer sheet laminated between two relatively easy to handle sheets, resulting in a multiple layer interlayer that is relatively easy to handle and which can be incorporated directly into existing processes that previously used a single polymer sheet having the composition of the outer two polymer sheets of the interlayer of the present invention, or a composition that results in similar processing characteristics (for example, blocking tendency).

In other embodiments utilizing three polymer sheets in a single interlayer, the third polymer sheet has a different composition than the first polymer sheet, and the differences in composition between the third polymer sheet and the second polymer sheet can be any of the differences given above for the differences between the first polymer sheet and the second polymer sheet. For example, one exemplary embodiment would be: first polymer sheet with a residual hydroxyl content of 20%//second polymer sheet with a residual hydroxyl content of 16%//third polymer sheet with a residual hydroxyl content of 18%. It will be noted that, in this example, the third polymer sheet differs from the second polymer sheet at least in that it has a residual hydroxyl content that is 2% greater than the hydroxyl content of the second polymer sheet. Of course, any of the other differences noted herein throughout can singly or in combination distinguish the third polymer layer from the second polymer layer.

In addition to the three layer embodiments described herein, further embodiments include interlayers having more than three layers in which further low residual hydroxyl sheets can be used, for example, iterations of polymer sheets having alternating plasticizer contents with alternating hydroxyl content and optionally low or negligible residual acetate content. Interlayers formed in such a manner can have, for example, 4, 5, 6, or up to 10 individual layers.

Other conventional layers, as are known in the art, can be incorporated into the interlayers of the present invention. For example, polymer films (described in detail elsewhere herein) such as polyesters like poly(ethylene terephthalate) having a metallized layer, an infrared reflecting stack, or other performance layer deposited thereon, can be included between any two layers of polymer sheets of the present invention. For example, in a two layer embodiment, an interlayer can be fabricated with the following layout: polymer sheet with relatively high plasticizer content//polyester film having a performance layer//polymer sheet with relatively low plasticizer content. In general, additional layers of thermoplastics, such as poly(vinyl butyral), polyester films, primer layers, and hardcoat layers can be added to the multiple layer interlayers of the present invention according to the desired result and the particular application.

In various embodiments of the present invention, the same sound reducing effect that is characteristic of a two polymer sheet interlayer having different plasticizer content is achieved in a single polymer sheet through the use of coextrusion processes. As is well known in the art, coextrusion can be used to form a single polymer sheet that has regions within the sheet, wherein each region is approximately the shape that a separate layer would be if multiple sheets were used. For each interlayer embodiment of the present invention in which two or more separate polymer sheets are disposed in contact with one another and subsequently laminated into a single interlayer, there also exists an embodiment where a coextruded polymer sheet has two or more distinct regions corresponding to the individual layers in a laminated interlayer of the present invention. Further, for each of the multiple layer glass panels, methods of producing interlayers, and methods of producing multiple layer glass panels of the present invention in which separate polymer sheets are laminated together, there is also an analogous embodiment employing a coextruded polymer sheet in place of the multiple layer interlayer.

In addition to the interlayers provided herein, the present invention also provides methods of reducing the level of sound through an opening, comprising the step of disposing in the opening a multiple layer glass panel comprising any of the interlayers of the present invention.

The present invention also includes methods of manufacturing an interlayer, comprising the steps of forming a first polymer sheet and a second polymer sheet, wherein the two polymer sheets have different compositions, as described elsewhere herein, and laminating the two polymer sheets together to form the interlayer.

The present invention also includes methods of manufacturing an interlayer, comprising the steps of forming a first polymer sheet, a second polymer sheet, and a third polymer sheet, wherein the three polymer sheets have compositions according to the three layer embodiments as described elsewhere herein, and laminating the three polymer sheets together to form the interlayer.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multiple layer interlayer of the present invention.

The present invention also includes multiple layer glass panels, such as windshields and architectural windows, comprising a multiple layer interlayer of the present invention.

Also included are multiple layer glazing panels having plastics, such as acrylics, or other suitable materials in place of the glass panels.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or and antifog layer, as are known in the art.

Polymer Sheet

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

The polymer sheet can comprise any suitable polymer, and, in a preferred embodiment, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In other embodiments, the polymer sheet comprises plasticized poly(vinyl butyral). In further embodiments the polymer sheet comprises poly(vinyl butyral) and one or more other polymers. Other polymers having a proper plasticizing capacity can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that in various embodiments, residual hydroxyl content will be controlled, as described elsewhere herein.

In various embodiments, the polymer sheet comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight.

If additional, conventional polymer sheets are used in addition to any of the embodiments described above as having plasticizer content differences, those additional, conventional polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethylhexanoate).

Adhesion control agents (ACAs) can also be included in the polymer sheets of the present invention to impart the desired adhesiveness. These agents can be incorporated into the outer sheets in a three polymer sheet embodiment, for example. Any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer sheets of the present invention comprise, in addition to sodium acetate, magnesium bis(2-ethyl butyrate)(chemical abstracts number 79992-76-0). The magnesium salt can be included in an amount effective to control adhesion of the polymer sheet to glass.

Additives may be incorporated into the polymer sheet to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer sheets. Agents that can be used include dyes and pigments such as indium tin oxide, antimony tin oxide, or lanthanum hexaboride ($LaB_6$).

Any suitable method can be used to produce the polymer sheets and the multiple layer interlayers of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet. In either embodiment, the surface texture at either or both sides of the layer may be controlled by adjusting the surfaces of the die opening or by providing texture at the roller surface. Other techniques for controlling the layer texture include varying parameters of the materials (for example, the water content of the resin and/or the plasticizer, the melt temperature, molecular weight distribution of the poly(vinyl butyral), or combinations of the foregoing parameters). Furthermore, the layer can be configured to include spaced projections that define a temporary surface irregularity to facilitate the de-airing of the layer during lamination processes after which the elevated temperatures and pressures of the laminating process cause the projections to melt into the layer, thereby resulting in a smooth finish.

Fabrication of a multiple layer interlayer can be accomplished by using known techniques in the art, such as independently producing three layers of polymer sheet, and then laminating the three sheets together under appropriate conditions, such as pressure and heat, to yield a single, multiple layer interlayer.

Polymer sheets of the present invention that comprise regions having differing plasticizer content can be produced by any method known in the art. In a typical method, two or more melts comprising polymer resin, plasticizer, and any desired additives can be independently formed and coextruded to form a single polymer sheet having regions corresponding to each melt used. For example a first melt with a defined plasticizer content and a second melt having a plasticizer content that is 20 phr less than the plasticizer content of a first melt can be coextruded to form a polymer sheet having a first region and a second region, each approximating the shape of an individual sheet, wherein the second region has a plasticizer content that is stably 20 phr less than the plasticizer content of the first melt.

In various embodiments, the interlayers of the present invention can have total thicknesses of 0.1 to 2.5 millimeters, 0.2 to 2.0 millimeters, 0.25 to 1.75 millimeters, and 0.3 to 1.5 millimeters (mm). The individual polymer sheets of a multiple layer interlayer can have, for example, approximately equal thicknesses that, when added together, result in the total thickness ranges given above. Of course, in other embodiments, the thicknesses of the layers can be different, and can still add to the total thicknesses given above.

The parameters for the polymer sheet described above apply as well to any layer in a multiple layer construct of the present invention that is a poly(vinyl butyral) type layer.

The following paragraphs describe various techniques that can be used to improve and/or measure the characteristics of the polymer sheet.

The clarity of a polymer sheet, and particularly a poly (vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corp. by methods described in international standard ISO 9050:1990. In various embodiments, the transmittance through a polymer sheet of the present invention is at least 60%, at least 70%, or at least 80%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −18° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of 10 standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

Tensile break stress can be determined for a polymer sheet according to the procedure described in JIS K6771.

EXAMPLES

Poly(vinyl butyral) sheets having noted residual hydroxyl content formulated with various amount of 3GEH (triethylene glycol di-(2-ethylhexanoate)), and their sheet thicknesses are listed in Table 1. These sheets are either used to construct the interlayers of the present invention or used as the conventional interlayer for making reference panels. In all sheets, the residual acetate contents are negligible and are less than 1 mole

TABLE 1

Poly(vinyl butyral) sheets

| PVB Sheet No. | Poly(vinyl butyral) sheet | Residual hydroxyl content (%) | 3GEH content (phr) | Sheet thickness (mil) |
|---|---|---|---|---|
| 1 | PVB-1 | 18.5 | 38 | 30 |
| 2 | PVB-2 | 18.5 | 38 | 45 |
| 3 | PVB-3 | 18.5 | 35 | 13 |
| 4 | PVB-4 | 18.5 | 38 | 13 |
| 5 | PVB-5 | 18.5 | 38 | 15 |
| 6 | PVB-6 | 18.5 | 22 | 30 |
| 7 | PVB-7 | 15.7 | 52 | 15 |
| 8 | PVB-8 | 15.9 | 51 | 20 |
| 9 | PVB-9 | 13.5 | 73.7 | 9 |
| 10 | PVB-10 | 11.8 | 72.9 | 9 |
| 11 | PVB-11 | 11.8 | 72.9 | 6 |

Conventional interlayers and examples of the interlayers of the present invention are shown in the Table 2.

TABLE 2

| Interlayer No | Interlayer construction with multiple sheets | | | Difference in OH content between sheets 1 and 2 (%) | 3GEH content as formulated in multiple sheet | | | Measured 3GEH content in each sheet after 4 weeks (phr) * | | | Measured difference in 3GEH content between sheets 1 and 2 (phr) * |
|---|---|---|---|---|---|---|---|---|---|---|---|
| | Sheet 1 | Sheet 2 | Sheet 3 | | Sheet 1 | Sheet 2 | Sheet 3 | Sheet 1 | Sheet 2 | Sheet 3 | |
| 1 (conventional) | — | PVB1 | — | — | — | 38 | — | — | 38 | — | — |
| 2 (conventional) | — | PVB2 | — | — | — | 38 | — | — | 38 | — | — |
| 3 (conventional) | PVB1 | PVB6 | — | 0 | 38 | 22 | — | 30 | 30 | — | 0 |
| 4 | PVB5 | PVB7 | PVB5 | 2.8 | 38 | 52 | 38 | 38.2 | 51.8 | 38.2 | 13.6 |
| 5 | PVB5 | PVB8 | — | 2.7 | 38 | 51 | 38 | 38 | 51 | 38 | 13 |
| 6 | PVB4 | PVB9 | PVB4 | 5 | 38 | 73.7 | 38 | 37.8 | 73.2 | 37.8 | 35.4 |
| 7 | PVB4 | PVB10 | PVB4 | 6.7 | 38 | 75 | 38 | 37.8 | 75.6 | 37.8 | 37.6 |
| 8 | PVB3 | PVB10 | PVB3 | 6.7 | 35 | 72.9 | 35 | 35.1 | 72.7 | 35.1 | 37.8 |
| 9 | PVB3 | PVB11 | PVB3 | 6.7 | 35 | 72.9 | 35 | 35.0 | 73.0 | 35.0 | 36.0 |

* The interlayers are stored at either cold temperature, typically 10° C., or at room temperature, typically 20 to 23° C.

Conventional laminated glass, i.e., reference panels, and examples of laminated glass consists of interlayers noted their improvements in acoustical performance relative to the reference panels are shown in Table 3.

TABLE 3

| Laminate No. | Interlayer construction | | | Combined glass thickness (mm) * | STL at reference frequency (dB) ** | STL improvement at reference frequency (dB) ** |
|---|---|---|---|---|---|---|
| | Sheet 1 | Sheet 2 | Sheet 3 | | | |
| 1 | — | PVB1 | — | 4.2 | 31 | 0 |
| 2 | — | PVB1 | — | 4.6 | 32 | 0 |
| 3 | — | PVB2 | — | 4.2 | 31 | 0 |
| 4 | PVB1 | PVB6 | — | 4.6 | 32 | 0 |
| 5 | PVB5 | PVB7 | PVB5 | 4.6 | 37 | 5 |
| 6 | PVB5 | PVB8 | — | 4.2 | 38 | 7 |

TABLE 3-continued

| Laminate | Interlayer construction | | | Combined glass thickness | STL at reference frequency | STL improvement at reference frequency |
|---|---|---|---|---|---|---|
| No. | Sheet 1 | Sheet 2 | Sheet 3 | (mm) * | (dB) ** | (dB) ** |
| 7 | PVB4 | PVB9 | PVB4 | 4.2 | 39 | 8 |
| 8 | PVB4 | PVB10 | PVB4 | 4.6 | 41 | 9 |
| 9 | PVB3 | PVB10 | PVB3 | 4.2 | 41 | 10 |
| 10 | PVB3 | PVB11 | PVB3 | 4.2 | 39 | 8 |

* Glass laminates contained two panes of symmetric glass sheet, i.e., each of the glass sheets has equal thickness.
** STL = Sound transmission loss.

By virtue of the present invention, it is now possible to provide multiple layer interlayers that reduce sound transmission and that are easily handled and readily incorporated into multiple layer constructs, such as laminated glass panels for windshields and architectural windows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising residual acetate content in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

I claim:

1. A polymer interlayer comprising:
a first polymer sheet comprising a plasticized poly(vinyl butyral);
a second polymer sheet comprising a plasticized poly(vinyl butyral), wherein said second polymer sheet is in direct contact with said first polymer sheet;
a third polymer sheet comprising a plasticized poly(vinyl butyral), wherein said third polymer sheet is in direct contact with said second polymer sheet;
wherein the amount of plasticizer in said plasticized poly(vinyl butyral) of said second polymer sheet is at least 12 parts per hundred greater than the amount of plasticizer in either said plasticized poly(vinyl butyral) of said first polymer sheet or said plasticized poly(vinyl butyral) of said third polymer sheet;
wherein said second polymer sheet has a residual hydroxyl content per weight percentage that is at least 2% lower than the residual hydroxyl content per weight percentage of either said first polymer sheet or said third polymer sheet; and,
wherein said first polymer sheet and said second polymer sheet each have a residual acetate content of less than 5 mol percent.

2. The interlayer of claim 1, wherein the amount of plasticizer in said plasticized poly(vinyl butyral) of said second polymer sheet is at least 15 parts per hundred greater than the amount of plasticizer in either said plasticized poly(vinyl butyral) of said first polymer sheet or said plasticized poly(vinyl butyral) of said third polymer sheet.

3. The interlayer of claim 1, wherein the amount of plasticizer in said plasticized poly(vinyl butyral) of said second polymer sheet is at least 18 parts per hundred greater than the amount of plasticizer in either said plasticized poly(vinyl butyral) of said first polymer sheet or said plasticized poly(vinyl butyral) of said third polymer sheet.

4. The interlayer of claim 1, wherein the amount of plasticizer in said plasticized poly(vinyl butyral) of said second polymer sheet is at least 20 parts per hundred greater than the amount of plasticizer in either said plasticized poly(vinyl butyral) of said first polymer sheet or said plasticized poly(vinyl butyral) of said third polymer sheet.

5. The interlayer of claim 1, wherein the amount of plasticizer in said plasticized poly(vinyl butyral) of said second polymer sheet is at least 25 parts per hundred greater than the amount of plasticizer in either said plasticized poly(vinyl butyral) of said first polymer sheet or said plasticized poly(vinyl butyral) of said third polymer sheet.

6. The interlayer of claim 1, wherein said first polymer sheet and said third polymer sheet each have a residual hydroxyl content of less than 25% and said second polymer sheet has a residual hydroxyl content of less than 23%.

7. The interlayer of claim 1, wherein said first polymer sheet and said third polymer sheet each have a residual hydroxyl content of less than 23% and said second polymer sheet has a residual hydroxyl content of less than 21%.

8. The interlayer of claim 1, wherein said first polymer sheet and said third polymer sheet each have a residual hydroxyl content of less than 21% and said second polymer sheet has a residual hydroxyl content of less than 19%.

9. The interlayer of claim 1, wherein said first polymer sheet and said third polymer sheet each have a residual hydroxyl content of less than 20% and said second polymer sheet has a residual hydroxyl content of less than 17%.

10. A polymer interlayer comprising:
- a first polymer sheet comprising a plasticized poly(vinyl butyral);
- a second polymer sheet comprising a plasticized poly(vinyl butyral), wherein said second polymer sheet is in direct contact with said first polymer sheet;
- a third polymer sheet comprising a plasticized poly(vinyl butyral), wherein said third polymer sheet is in direct contact with said second polymer sheet;
- wherein the amount of plasticizer in said plasticized poly(vinyl butyral) of said second polymer sheet is at least 10 parts per hundred greater than the amount of plasticizer in either said plasticized poly(vinyl butyral) of said first polymer sheet or said plasticized poly(vinyl butyral) of said third polymer sheet;
- wherein said second polymer sheet has a residual hydroxyl content per weight percentage that is at least 2% lower than the residual hydroxyl content per weight percentage of either said first polymer sheet or said third polymer sheet;
- wherein said first polymer sheet and said second polymer sheet each have a residual acetate content of less than 5 mol percent; and,
- wherein said first polymer sheet and said third polymer sheet each have a residual hydroxyl content of less than 23% and said second polymer sheet has a residual hydroxyl content of less than 21%.

11. The interlayer of claim 10, wherein the amount of plasticizer in said plasticized poly(vinyl butyral) of said second polymer sheet is at least 15 parts per hundred greater than the amount of plasticizer in either said plasticized poly(vinyl butyral) of said first polymer sheet or said plasticized poly(vinyl butyral) of said third polymer sheet.

12. The interlayer of claim 10, wherein the amount of plasticizer in said plasticized poly(vinyl butyral) of said second polymer sheet is at least 18 parts per hundred greater than the amount of plasticizer in either said plasticized poly(vinyl butyral) of said first polymer sheet or said plasticized poly(vinyl butyral) of said third polymer sheet.

13. The interlayer of claim 10, wherein the amount of plasticizer in said plasticized poly(vinyl butyral) of said second polymer sheet is at least 20 parts per hundred greater than the amount of plasticizer in either said plasticized poly(vinyl butyral) of said first polymer sheet or said plasticized poly(vinyl butyral) of said third polymer sheet.

14. The interlayer of claim 10, wherein the amount of plasticizer in said plasticized poly(vinyl butyral) of said second polymer sheet is at least 25 parts per hundred greater than the amount of plasticizer in either said plasticized poly(vinyl butyral) of said first polymer sheet or said plasticized poly(vinyl butyral) of said third polymer sheet.

15. The interlayer of claim 10, wherein said first polymer sheet and said third polymer sheet each have a residual hydroxyl content of less than 21% and said second polymer sheet has a residual hydroxyl content of less than 19%.

16. The interlayer of claim 10, wherein said first polymer sheet and said third polymer sheet each have a residual hydroxyl content of less than 20% and said second polymer sheet has a residual hydroxyl content of less than 17%.

17. The interlayer of claim 10, wherein said first polymer sheet and said third polymer sheet each have a residual hydroxyl content of less than 18% and said second polymer sheet has a residual hydroxyl content of less than 15%.

18. The interlayer of claim 10, wherein said first polymer sheet and said third polymer sheet each have a residual hydroxyl content of less than 15% and said second polymer sheet has a residual hydroxyl content of less than 12%.

19. A polymer interlayer comprising:
- a first polymer sheet comprising plasticized poly(vinyl butyral);
- a second polymer sheet comprising plasticized poly(vinyl butyral), wherein the amount of plasticizer in said plasticized poly(vinyl butyral) of said second polymer sheet is at least 10 parts per hundred greater than the amount of plasticizer in said plasticized poly(vinyl butyral) of said first polymer sheet, wherein said second polymer sheet has a residual hydroxyl content per weight percentage that is at least 2% lower than the residual hydroxyl content per weight percentage of said first polymer sheet, wherein said first polymer sheet and said second polymer sheet are in direct contact with each other, and wherein said first polymer sheet and said second polymer sheet each have a residual acetate content of less than 5 mol percent;
- a third polymer sheet disposed in contact with said second polymer sheet, wherein said third polymer sheet comprises plasticized poly(vinyl butyral) and wherein the amount of plasticizer in said plasticized poly(vinyl butyral) of said second polymer sheet is at least 10 parts per hundred greater than the amount of plasticizer in said plasticized poly(vinyl butyral) of said third polymer sheet; and,
- wherein the amount of plasticizer in said second polymer sheet remains at least 10 parts per hundred greater than the amount of plasticizer in said first polymer sheet and said third polymer sheet.

20. The polymer interlayer of claim 19, wherein the amount of plasticizer in said second polymer sheet remains at least 10 parts per hundred greater than the amount of plasticizer in said first polymer sheet and said third polymer sheet after remaining in contact with said second polymer sheet and said third polymer sheet for at least four weeks.

21. A multiple layer glass panel, comprising,
- a polymer interlayer, comprising:
- a first polymer sheet comprising a plasticized poly(vinyl butyral);
- a second polymer sheet comprising a plasticized poly(vinyl butyral), wherein said second polymer sheet is in direct contact with said first polymer sheet;
- a third polymer sheet comprising a plasticized poly(vinyl butyral), wherein said third polymer sheet is in direct contact with said second polymer sheet;
- wherein the amount of plasticizer in said plasticized poly(vinyl butyral) of said second polymer sheet is at least 12 parts per hundred greater than the amount of plasticizer in either said plasticized poly(vinyl butyral) of said first polymer sheet or said plasticized poly(vinyl butyral) of said third polymer sheet;
- wherein said second polymer sheet has a residual hydroxyl content per weight percentage that is at least 2% lower than the residual hydroxyl content per weight percentage of either said first polymer sheet or said third polymer sheet; and,
- wherein said first polymer sheet and said second polymer sheet each have a residual acetate content of less than 5 mol percent.

22. The panel of claim 21, wherein the amount of plasticizer in said plasticized poly(vinyl butyral) of said second polymer sheet is at least 15 parts per hundred greater than the amount of plasticizer in either said plasticized poly(vinyl butyral) of said first polymer sheet or said plasticized poly(vinyl butyral) of said third polymer sheet.

23. The panel of claim 21, wherein the amount of plasticizer in said plasticized poly(vinyl butyral) of said second polymer sheet is at least 18 parts per hundred greater than the amount of plasticizer in either said plasticized poly(vinyl butyral) of said first polymer sheet or said plasticized poly (vinyl butyral) of said third polymer sheet.

24. The panel of claim 21, wherein the amount of plasticizer in said plasticized poly(vinyl butyral) of said second polymer sheet is at least 20 parts per hundred greater than the amount of plasticizer in either said plasticized poly(vinyl butyral) of said first polymer sheet or said plasticized poly (vinyl butyral) of said third polymer sheet.

25. The panel of claim 21, wherein the amount of plasticizer in said plasticized poly(vinyl butyral) of said second polymer sheet is at least 25 parts per hundred greater than the amount of plasticizer in either said plasticized poly(vinyl butyral) of said first polymer sheet or said plasticized poly (vinyl butyral) of said third polymer sheet.

26. The panel of claim 21, wherein said first polymer sheet and said third polymer sheet each have a residual hydroxyl content of less than 25% and said second polymer sheet has a residual hydroxyl content of less than 23%.

27. The panel of claim 21, wherein said first polymer sheet and said third polymer sheet each have a residual hydroxyl content of less than 23% and said second polymer sheet has a residual hydroxyl content of less than 21%.

28. The panel of claim 21, wherein said first polymer sheet and said third polymer sheet each have a residual hydroxyl content of less than 21% and said second polymer sheet has a residual hydroxyl content of less than 19%.

29. The panel of claim 21, wherein said first polymer sheet and said third polymer sheet each have a residual hydroxyl content of less than 20% and said second polymer sheet has a residual hydroxyl content of less than 17%.

30. A multiple layer glass panel, comprising,
a polymer interlayer comprising:
a first polymer sheet comprising a plasticized poly(vinyl butyral);
a second polymer sheet comprising a plasticized poly(vinyl butyral), wherein said second polymer sheet is in direct contact with said first polymer sheet;
a third polymer sheet comprising a plasticized poly(vinyl butyral), wherein said third polymer sheet is in direct contact with said second polymer sheet;
wherein the amount of plasticizer in said plasticized poly (vinyl butyral) of said second polymer sheet is at least 10 parts per hundred greater than the amount of plasticizer in either said plasticized poly(vinyl butyral) of said first polymer sheet or said plasticized poly(vinyl butyral) of said third polymer sheet;
wherein said second polymer sheet has a residual hydroxyl content per weight percentage that is at least 2% lower than the residual hydroxyl content per weight percentage of either said first polymer sheet or said third polymer sheet;
wherein said first polymer sheet and said second polymer sheet each have a residual acetate content of less than 5 mol percent; and,
wherein said first polymer sheet and said third polymer sheet each have a residual hydroxyl content of less than 23% and said second polymer sheet has a residual hydroxyl content of less than 21%.

31. The panel of claim 30, wherein the amount of plasticizer in said plasticized poly(vinyl butyral) of said second polymer sheet is at least 15 parts per hundred greater than the amount of plasticizer in either said plasticized poly(vinyl butyral) of said first polymer sheet or said plasticized poly (vinyl butyral) of said third polymer sheet.

32. The panel of claim 30, wherein the amount of plasticizer in said plasticized poly(vinyl butyral) of said second polymer sheet is at least 18 parts per hundred greater than the amount of plasticizer in either said plasticized poly(vinyl butyral) of said first polymer sheet or said plasticized poly (vinyl butyral) of said third polymer sheet.

33. The panel of claim 30, wherein the amount of plasticizer in said plasticized poly(vinyl butyral) of said second polymer sheet is at least 20 parts per hundred greater than the amount of plasticizer in either said plasticized poly(vinyl butyral) of said first polymer sheet or said plasticized poly (vinyl butyral) of said third polymer sheet.

34. The panel of claim 30, wherein the amount of plasticizer in said plasticized poly(vinyl butyral) of said second polymer sheet is at least 25 parts per hundred greater than the amount of plasticizer in either said plasticized poly(vinyl butyral) of said first polymer sheet or said plasticized poly (vinyl butyral) of said third polymer sheet.

35. The panel of claim 30, wherein said first polymer sheet and said third polymer sheet each have a residual hydroxyl content of less than 21% and said second polymer sheet has a residual hydroxyl content of less than 19%.

36. The panel of claim 30, wherein said first polymer sheet and said third polymer sheet each have a residual hydroxyl content of less than 20% and said second polymer sheet has a residual hydroxyl content of less than 17%.

37. The panel of claim 30, wherein said first polymer sheet and said third polymer sheet each have a residual hydroxyl content of less than 18% and said second polymer sheet has a residual hydroxyl content of less than 15%.

38. The panel of claim 30, wherein said first polymer sheet and said third polymer sheet each have a residual hydroxyl content of less than 15% and said second polymer sheet has a residual hydroxyl content of less than 12%.

* * * * *